United States Patent
Lawrence et al.

(10) Patent No.: US 10,343,611 B2
(45) Date of Patent: Jul. 9, 2019

(54) VEHICLE INTERIOR LID FOR COVERING INTERIOR COMPONENT AIRBAG ATTACHMENT

(71) Applicant: Honda Motor Co., Ltd., Tokyo (JP)

(72) Inventors: Emily G. Lawrence, Columbus, OH (US); Toshimitsu Shimizu, Rancho Palos Verdes, CA (US); Jason Dilley, Plain City, OH (US)

(73) Assignee: Honda Motor Co., Ltd., Tokyo (JP)

( * ) Notice: Subject to any disclaimer, the term of this patent is extended or adjusted under 35 U.S.C. 154(b) by 677 days.

(21) Appl. No.: 14/880,818

(22) Filed: Oct. 12, 2015

(65) Prior Publication Data

US 2016/0031490 A1 Feb. 4, 2016

Related U.S. Application Data

(63) Continuation-in-part of application No. 14/048,154, filed on Oct. 8, 2013, now Pat. No. 9,157,258.

(51) Int. Cl.
*E05C 19/06* (2006.01)
*B60R 5/04* (2006.01)
*B60R 13/02* (2006.01)
*E05B 17/18* (2006.01)
*E05B 53/00* (2006.01)
(Continued)

(52) U.S. Cl.
CPC .......... *B60R 5/044* (2013.01); *B60R 13/0206* (2013.01); *B60R 13/0268* (2013.01); *E05B 17/18* (2013.01); *E05B 53/00* (2013.01); *E05B 81/90* (2013.01); *E05B 83/18* (2013.01); *E05B 85/06* (2013.01); *E05C 19/063* (2013.01);
(Continued)

(58) Field of Classification Search
USPC .............................................. 292/80, 81, 87
See application file for complete search history.

(56) References Cited

U.S. PATENT DOCUMENTS

| | | | |
|---|---|---|---|
| 1,144,140 A | 6/1915 | Kroedel et al. | |
| 4,092,527 A | 5/1978 | Luecke | |

(Continued)

FOREIGN PATENT DOCUMENTS

| | | |
|---|---|---|
| DE | 3735920 | 11/1988 |
| DE | 4321711 | 1/1994 |

(Continued)

OTHER PUBLICATIONS

Office Action of U.S. Appl. No. 14/048,154 dated Jun. 30, 2015, 9 pages.

*Primary Examiner* — Carlos Lugo
(74) *Attorney, Agent, or Firm* — Rankin, Hill & Clark LLP

(57) ABSTRACT

A vehicle assembly includes an interior body panel having an outer surface including an opening portion, and a lid removably mounted to the body panel. The lid has a closed position for covering the opening portion and an opened position. Engagement between the lid and the body panel is adapted to allow the lid to pivot at least partially into the opening portion as the lid is moved from the closed position to the opened position. The lid defines a lid body having an exterior surface. An edge portion of the exterior surface is continuous and without interruption about a periphery of the exterior surface so that the lid body exterior surface is flush with the body panel outer surface about the entire periphery of the lid body exterior surface.

15 Claims, 15 Drawing Sheets

(51) Int. Cl.
*E05B 81/90* (2014.01)
*E05B 83/18* (2014.01)
*E05B 85/06* (2014.01)
*E05C 19/00* (2006.01)

(52) U.S. Cl.
CPC ............ *Y10S 292/11* (2013.01); *Y10S 292/63* (2013.01); *Y10T 70/5889* (2015.04)

(56) References Cited

U.S. PATENT DOCUMENTS

| | | |
|---|---|---|
| 5,050,922 A | 9/1991 | Falcoff |
| 5,060,990 A | 10/1991 | Smith et al. |
| 5,522,638 A | 6/1996 | Falcoff et al. |
| 5,588,669 A | 12/1996 | Leonard et al. |
| 5,603,524 A | 2/1997 | Barnes et al. |
| 5,671,943 A | 9/1997 | Barnhart |
| 5,683,158 A | 11/1997 | Lim |
| 5,816,640 A | 10/1998 | Nishimura |
| 6,003,925 A | 12/1999 | Litke et al. |
| 6,126,221 A | 10/2000 | Kern |
| 6,394,300 B1 | 5/2002 | Bosy |
| 6,497,445 B1 | 12/2002 | Combs |
| 6,761,384 B1 | 7/2004 | Haaf et al. |
| 7,073,817 B2 | 7/2006 | Rogers et al. |
| 7,175,217 B1 | 2/2007 | Lota |
| 7,815,237 B2 | 10/2010 | Robertson |
| 8,283,065 B2 | 10/2012 | Zhang |
| 8,562,062 B2 * | 10/2013 | Mineshima ........... B60R 19/023 24/682.1 |
| 9,157,258 B2 * | 10/2015 | Lawrence ............... E05B 83/18 |
| 2009/0096221 A1 | 4/2009 | Jan et al. |
| 2012/0200108 A1 | 8/2012 | Kamioka et al. |

FOREIGN PATENT DOCUMENTS

| | | |
|---|---|---|
| DE | 4305597 | 2/1994 |
| JP | S619344 | 1/1986 |
| JP | 04362423 | 12/1992 |
| JP | 09175228 | 7/1997 |
| JP | 2008189175 | 8/2008 |

* cited by examiner

VEHICLE INTERIOR LID FOR COVERING INTERIOR COMPONENT AIRBAG ATTACHMENT The present application is a continuation in-part of U.S. patent application Ser. No. 14/048,154, filed on Oct. 8, 2013, the entirety of which is incorporated herein by reference.

BACKGROUND

Typically, a vehicle interior component attachment (e.g., a fastener, such as a bolt or screw, for fastening an airbag) is covered by a cap or lid within the vehicle interior compartment. To remove the lid for access to the attachment generally requires a conventional pry tool (e.g., a flat head screw driver), and it is known to provide a function clearance feature, such as a notch, on the lid and/or interior component (e.g., garnish) for the pry tool. Because such a clearance feature can affect the appearance of the interior compartment, the lid and/or interior component can be devoid of the same. However, this, in turn, requires a specialized pry tool to remove the lid to avoid scratching or marring of the surface of the lid and/or interior component.

BRIEF DESCRIPTION

In accordance with one aspect, a vehicle assembly comprises an interior body panel having an outer surface including an opening portion, and a lid removably mounted to the body panel. The lid has a closed position for covering the opening portion and an opened position. Engagement between the lid and the body panel is adapted to allow the lid to pivot at least partially into the opening portion as the lid is moved from the closed position to the opened position. The lid defines a lid body having an exterior surface. An edge portion of the exterior surface is continuous and without interruption about a periphery of the exterior surface so that the lid body exterior surface is flush with the body panel outer surface about the entire periphery of the lid body exterior surface.

In accordance with another aspect, an interior body panel assembly for a vehicle comprises an interior body panel having an outer surface including an opening portion for receiving an attachment for releasably attaching an associated vehicle component to the body panel. The opening portion includes a bottom wall, opposed first and second side walls, and opposed first and second end walls. A lid is removably mounted to the body panel and has a closed position for covering the opening portion and an opened position. The lid defines a lid body having an exterior surface. A peripheral edge portion of the exterior surface is flush with the body panel outer surface. The lid body has an engagement member configured to releasably engage the first side wall of the opening portion. The first and second side walls are configured to support the lid in an at least a partially cantilevered condition over the bottom wall of the opening portion in the closed position.

In accordance with yet another aspect, a method of covering an opening portion provided in an interior vehicle body panel is provided. The exemplary method comprises providing a lid having a lid body sized to be received in the opening portion such that in a closed position of the lid an exterior surface of the lid body is flush with an outer surface of the body panel; releasably supporting a first portion of the lid body in the opening portion; cantilevering a second portion of the lid body in the opening portion; and pivoting the second portion of the lid body inwardly into the opening portion to move from the lid from the closed position toward an opened position.

DETAILED DESCRIPTION

It should, of course, be understood that the description and drawings herein are merely illustrative and that various modifications and changes can be made in the structures disclosed without departing from the present disclosure. In general, the figures of the exemplary vehicle interior lid are not to scale. It should be appreciated that the term "plurality" means "two or more", unless expressly specified otherwise. It will also be appreciated that the various identified components of the exemplary vehicle interior lid disclosed herein are merely terms of art that may vary from one manufacturer to another and should not be deemed to limit the present disclosure.

As used herein, lateral directions are transverse across the vehicle, i.e., left and right directions. Likewise, longitudinal directions refer to forward and rearward directions of vehicle travel, and the vertical directions relate to elevation, i.e., upward and downward directions.

Figure 1:
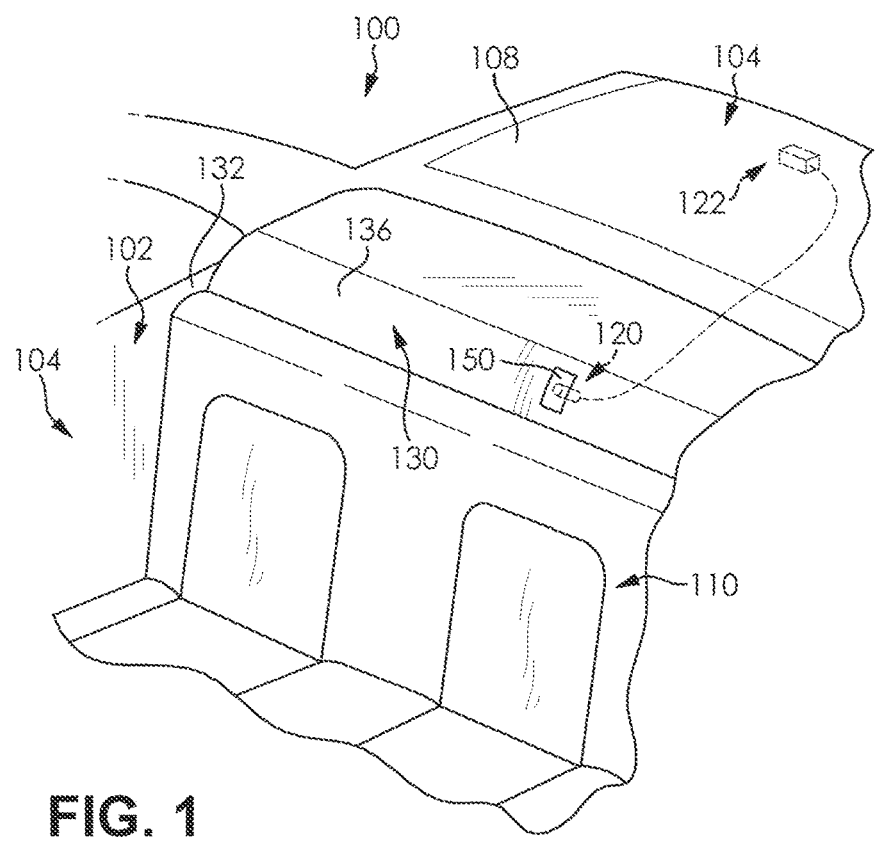
FIG. 1 is a schematic view of a vehicle assembly including an unlocking mechanism operably connected to a locking device of a trunk lid and configured to actuate the locking device to unlock the trunk lid from within a vehicle passenger compartment. The unlocking mechanism is concealed by an exemplary lid removably mounted to an exemplary interior body panel.
Figure 2:
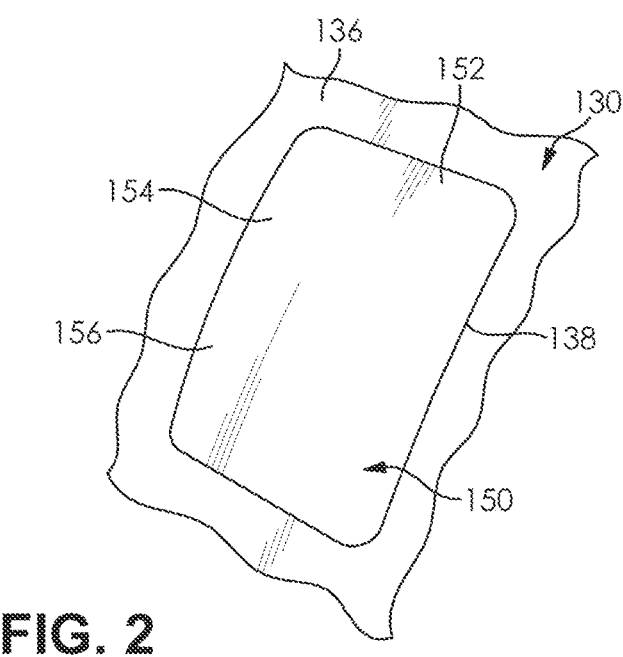
FIG. 2 is an enlarged view of the lid and interior body panel of FIG. 1 with the lid in a closed position.

Referring now to the drawings, wherein like numerals refer to like parts throughout the several views, FIGS. 1 and 2 schematically illustrate a vehicle assembly 100 including a vehicle body 102 defining a passenger compartment 104 and a storage or trunk compartment 106 covered by a trunk lid 108. A rear seat assembly 110 separates the passenger compartment 104 from the trunk compartment 106. An unlocking mechanism 120 is operably connected to a locking device 122 of the trunk lid 108 and is configured to actuate the locking device 122 to unlock the trunk lid 108 from within the vehicle passenger compartment 104. The unlocking mechanism 120 may be designed as a push-button switch that is electrically connected to the locking device 122 so that actuation of the switch unlocks the trunk lid 108. The unlocking mechanism 120 may also be designed as a key lock 124 (see FIGS. 4 and 8) mechanically connected to the locking device 122. One benefit of the key lock design of the unlocking mechanism 120 is that it allows the trunk lid 108 to be unlocked in emergency conditions when the vehicle battery is dead, which, in turn, can disable the electronic key.

Figure 4:
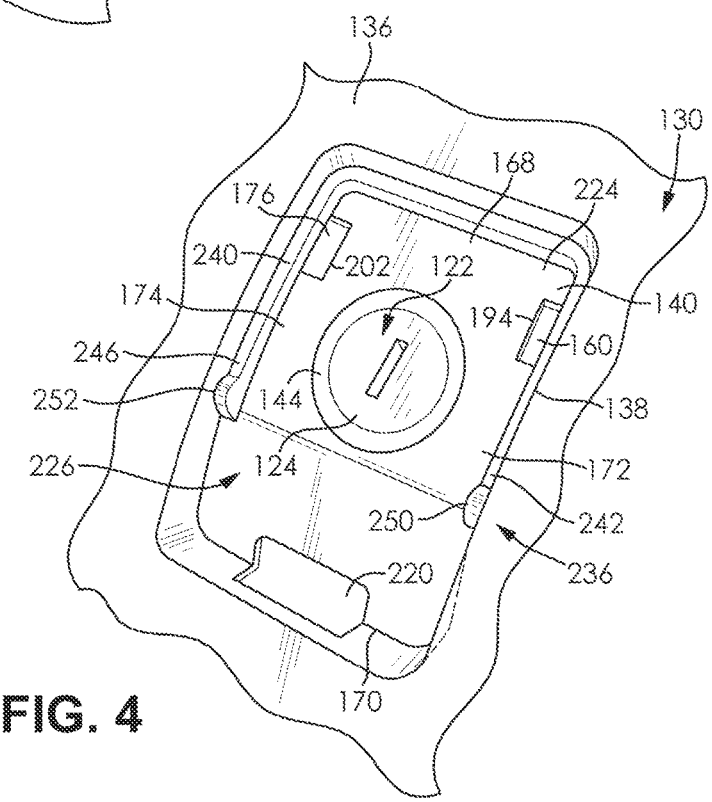
FIG. 4 is a schematic view of the interior body panel of FIG. 2 with the lid removed.

In the depicted embodiment, the unlocking mechanism 120 is mounted on part of the vehicle body 108 accessible from in the passenger compartment 104. Particularly, the unlocking mechanism is mounted on an interior body panel 130 provided rearward of the rear seat assembly 110. The interior body panel 130 spans laterally in the passenger compartment 104 between opposed side panels (only side panel 132 is shown) of the vehicle body 102 and can form part of a separating wall of the rear seat assembly 110. As shown in FIG. 4, the interior body panel 130 has an outer surface 136 including an opening portion 138 having a bottom wall 140 and a side wall 142. The bottom wall 140 is provided with an aperture 144 for receiving the unlocking mechanism 122. The unlocking mechanism 122 can be secured to the bottom wall 140 in a known manner.

A cover or lid 150 is removably mounted to the body panel 130 and has a closed position (FIG. 2) for covering the opening portion 138 and an opened position (FIG. 4) where the lid is completely removed from the body panel 130. As best depicted in FIG. 2, the exemplary lid 150 defines a lid body 152 having an exterior surface 154. An edge portion 156 of the exterior surface 154 is continuous and without interruption about a periphery of the exterior surface 154 so that the exterior surface of the lid body 152 is flush with the outer surface 136 of the body panel 130 about the entire periphery of the lid body exterior surface 154. By having the edge portion 156 of the exterior surface 154 devoid of an interruption, such as a cut-out shape or raised feature to accommodate an operator's finger or hand space, the exemplary lid 150 does not affect the aesthetic appearance of the body panel 130 to which the unlocking mechanism 122 is mounted.

Figure 3:
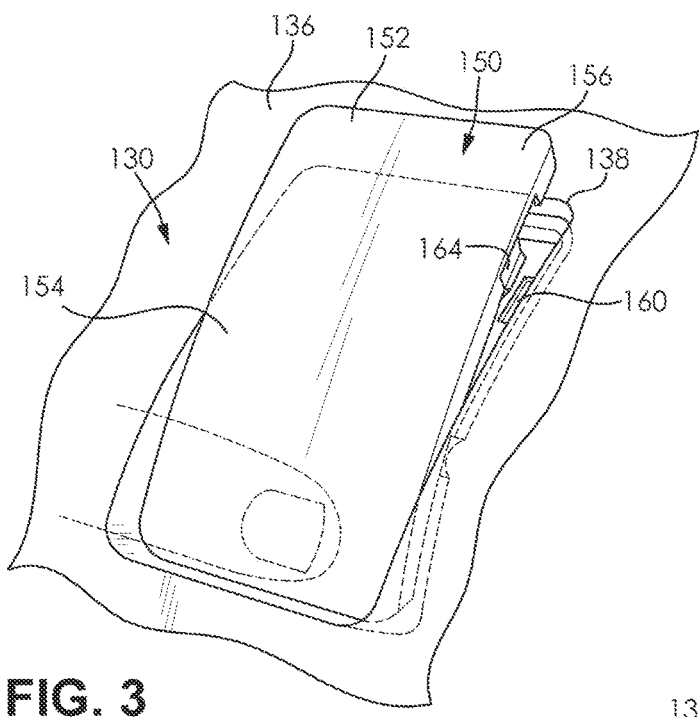
FIG. 3 is a view of the lid and interior body panel of FIG. 2 with the lid being moved from the closed position toward an opened position.

With reference to FIGS. 3 and 4, to releasably secure the lid 150 to the body panel 130, the bottom wall 140 of the opening portion 138 of the body panel 130 includes at least one engagement hole 160, and the lid body 152 includes at least one engagement member 164 which is received in the at least one engagement hole 160 extending from an interior surface 162 of the lid body 152. More particularly, the bottom wall 140 of the opening portion 138 includes opposed end portions 168, 170 and opposed side portions 172, 174 elongated relative to the end portions 168, 170. The at least one engagement hole 160 is provided on one of the side portions adjacent one of the end portions. As depicted, the at least one engagement hole 160 is a first engagement hole provided on side portion 172 adjacent end portion 168, and the bottom wall 140 includes a second engagement hole 176 provided on side portion 174 adjacent end portion 168. And the at least one engagement member 164 is a first engagement member that is received in the first engagement hole 160, and as depicted in FIG. 5 the interior surface 162 of the lid body 152 further includes a second engagement member 180 which is received in the second engagement hole 176.

Figure 5:
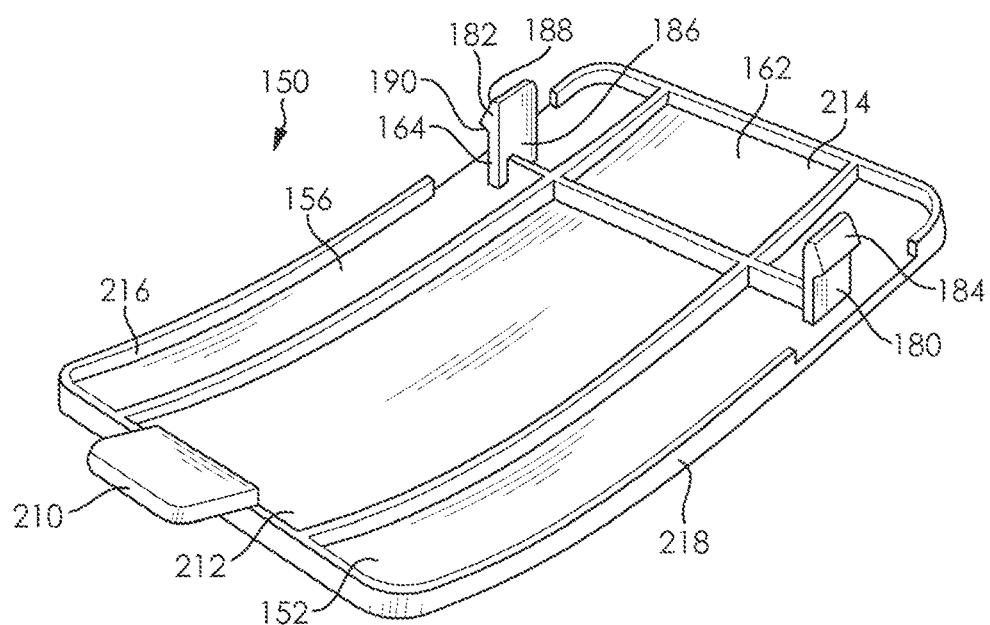
FIG. 5 is a bottom perspective view of the exemplary lid of FIG. 2.
Figure 9:
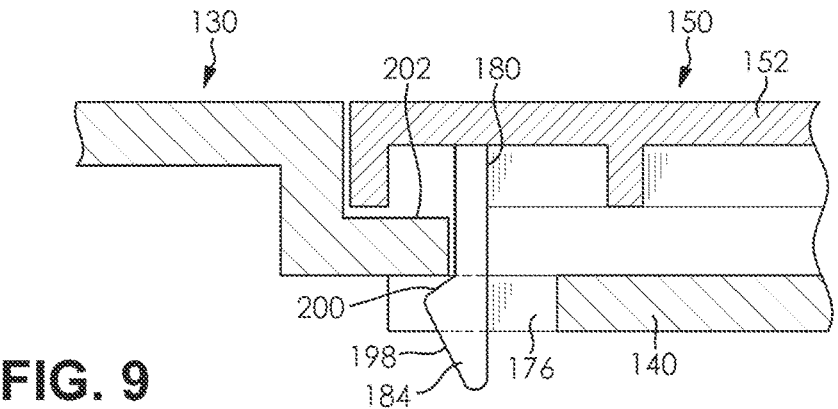
FIG. 9 is a cross-sectional view taken along line 9-9 of FIG. 6.

As shown in FIG. 5, each of the first and second engagement members 164, 180 projects outwardly from the interior surface 162 and includes a respective locking portion 182, 184 configured to engage the bottom wall 140 of the opening portion 138. According to one aspect, the first engagement member 164 includes a body 186 having one end attached to the interior surface 162. The locking portion 182 is provided at the other end of the body 186 and projects toward the edge portion 156. The locking portion 182 includes a first engaging surface 188 and a second engaging surface 190, each engaging surface 188, 190 being configured to at least partially displace the engagement member 164 as the lid 150 is being mounted to or removed from the body panel 130. By way of example, the first engaging surface 188 is canted away from the other end of the body 186 toward the edge portion 156, and the second engaging surface 190 is canted back toward the body 186. With this arrangement of the first and second engaging surfaces, the first engagement member 164 is in the form of a checked shaped or hooked tab. As the first engagement member 164 is being inserted into or removed from the engagement hole 160, a portion 194 of the bottom wall 140 defining the engagement hole 160 contacts the locking portion 182. This contact causes the first engagement member 164 to inwardly deflect and release from the bottom wall 140. In the depicted embodiment, the second engagement member 180 is shaped similar to the first engagement member 164 and the locking portion 184 is defined by first and second engaging surfaces 198, 200. As best depicted in FIG. 9, these engaging surface 198, 200 contact a portion 202 of the bottom wall 140 defining the engagement hole 176 and this, in turn, deflects the second engagement member 180 as the second engagement member 180 is being inserted into or removed from the engagement hole 176.

The lid body 152 further includes a retaining member 210 opposite the first and second engagement members 164, 180. According to one aspect, the retaining member 210 is in the form a tab located on one end portion 212 of the lid body 152 opposite the other end portion 214 having the first and second engagement members 164, 180 and is spaced inwardly from opposed sides 216, 218 of the lid body. As illustrated in FIG. 5, the retaining member 210 extends substantially perpendicularly from the end portion 212 and is oriented substantially perpendicular to the first and second engagement members 164, 180. To accommodate the retaining member 210 in the closed position of the lid 150, a retaining hole 220 is located in the opening portion 138. As shown, the retaining hole 220 is defined in the end portion 170 of the bottom wall 140 and a portion of the side wall 142 of the opening portion 138. This allows the retaining member 210 to move within the retaining hole 220 as the lid 150 is being moved from the closed position to the opened position. Further, as best depicted in FIG. 4, the bottom wall 140 of the opening portion 138 includes a first section 224 having the end portion 168 and a second section 226 having the other end portion 170. The second section 226 is angled inwardly relative to the first section 224, and the retaining hole 220 is located on the second section 226. By having the offset first and second sections 224, 226 of the bottom wall 140, to disengage the first and second engagement members 164, 180 from the bottom wall 140, the lid body 152 can be pivoted inwardly toward the second section 226 of the bottom wall 140. However, with the location of the retaining hole 220 in the opening portion 138, the retaining member 210 moves through the retaining hole 220 yet remains positioned in the retaining hole.

Figure 6:
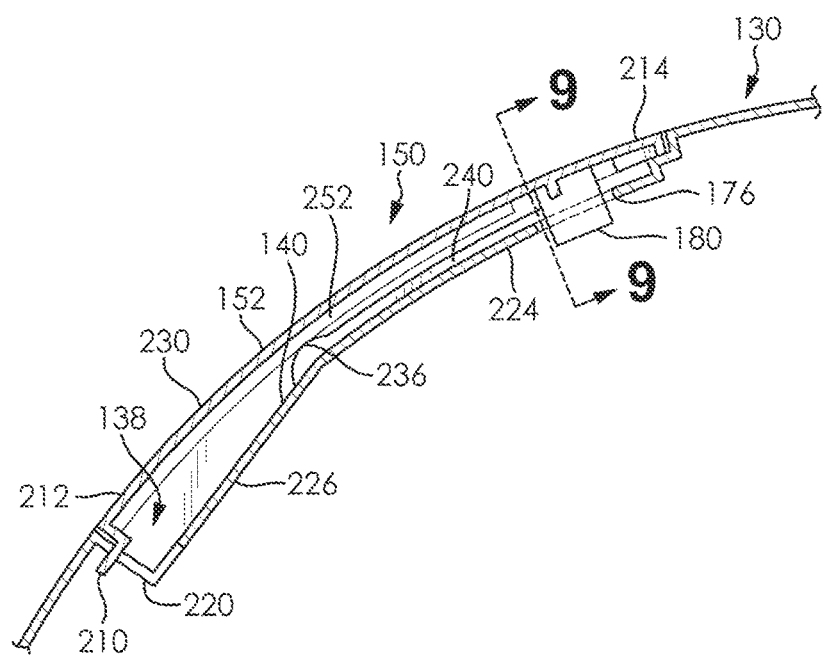
FIG. 6 is a cross-sectional view of the lid and body panel as shown in FIG. 2.
Figure 7:
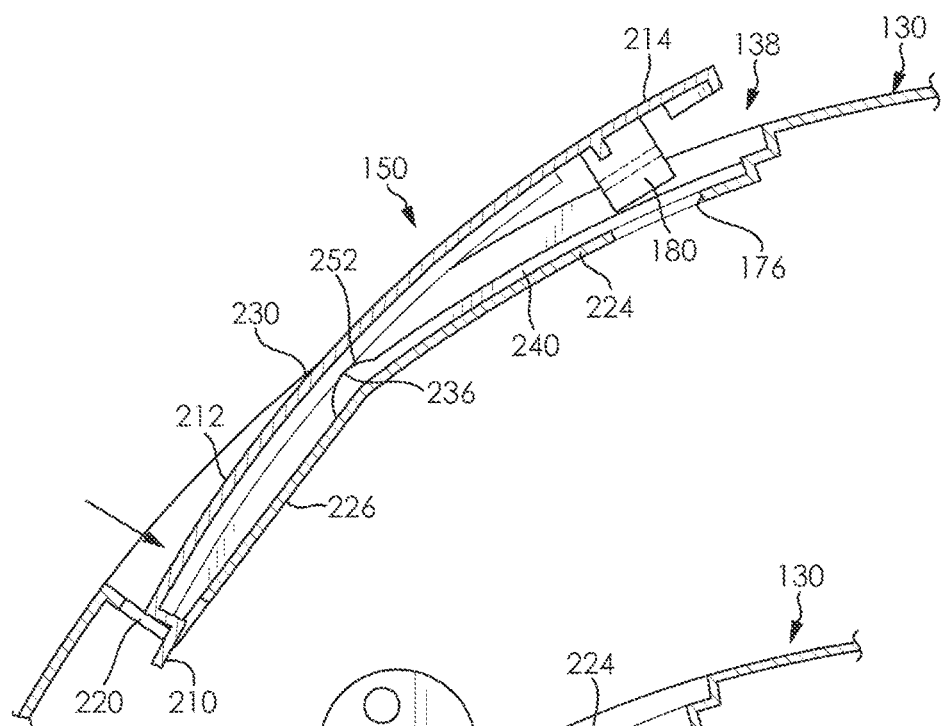
FIG. 7 is a cross-sectional view of the lid and body panel as shown in FIG. 3.
Figure 8:
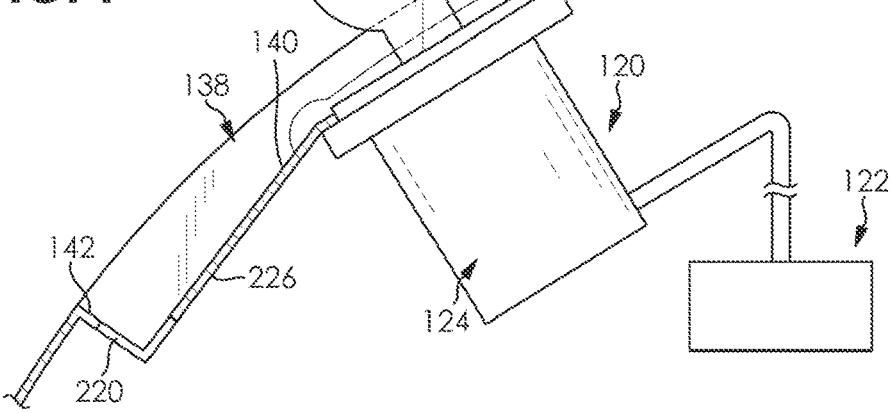
FIG. 8 is a cross-sectional view of the body panel as shown in FIG. 4 with the unlocking mechanism.

Particularly, and as best depicted in FIGS. 6 and 7, a portion 230 of the lid body 152 having the retaining member 210 is at least partially suspended over the second section 226 of the bottom wall 140 in the closed position of the lid 150. The first section 224 of the bottom wall 140 defines a pivot 236 by which the portion 230 of the lid body 152 is movable inwardly toward the second section 226 of the bottom wall 140. This pivoting movement of the lid portion 230 toward the second section 226 moves the end portion 214 of the lid body 152 having the first and second engagement members 164, 180 away from the first section 224 of the bottom wall 140. This, in turn, disengages the first and second engagement members from the bottom wall 140, the lid 150 now being removable from the opening portion 138 of the body panel 130 thereby providing access to the unlocking mechanism (FIG. 8). According to one aspect, the first section 224 of the bottom wall 140 of the opening portion 138 includes an elevated portion 240 that is elevated relative to the bottom wall 140 for contacting and supporting the interior surface 162 of the lid body 152, and an end 242 of the elevated portion 240 defines the pivot 236. In the illustrated embodiment of FIG. 4, the elevated portion 240 extends along each of the side portions 172, 174 and the end portion 168. The end 242 of the elevated portion 240 along the side portion 172 and an end 246 of the elevated portion along the side portion 174 include a respective curved portion 250, 252. The curved portions 250, 252 of the elevated portion 240 together define the pivot 236 allowing movement of the portion 230 of the lid body 152 having the retaining member 210 toward the second section 224 of the bottom wall 140 of the opening portion 138. Accordingly, to move the lid 150 from the closed position to the opened position the portion 230 of the lid body 152 is pivoted about the pivot 236 toward the second section 224 with the retaining member 210 remaining in the retaining hole 220, and movement of the portion 230 of the lid body 152 releases the each engagement member 164, 180 from the bottom wall 140 of the opening portion 138. The lid 150 can be placed back into the closed position by first positioning the retaining member 210 into the retaining hole 220 and then pivoting the lid 150 about the pivot 236 so that the first and second engagement members 164, 180 are received in the respective first and second engagement holes 160, 176 and engage the bottom wall 140.

Figure 10:
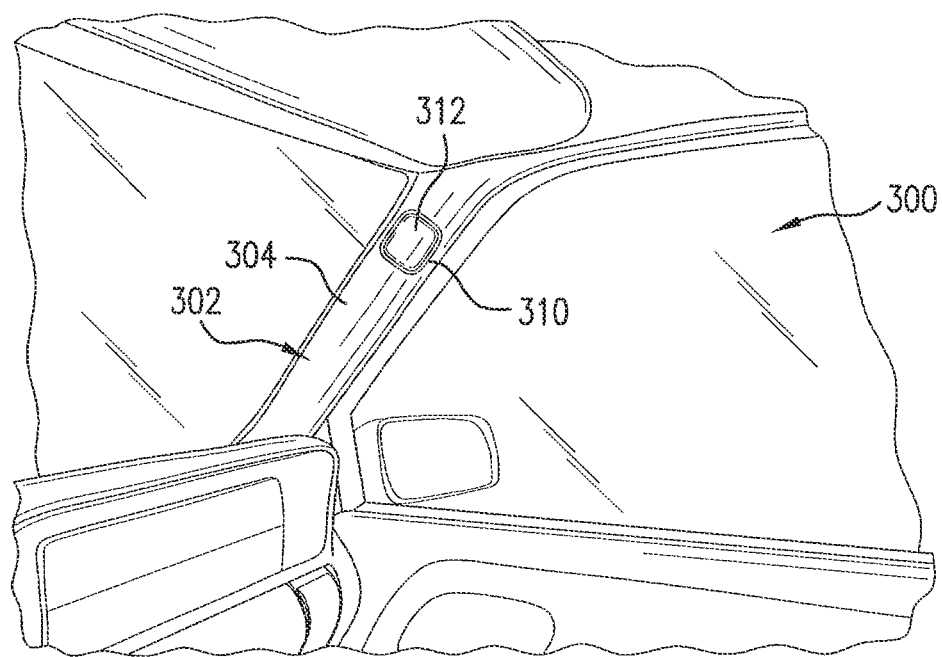
FIG. 10 is a schematic view of a vehicle assembly including an interior body panel and an exemplary lid removably mounted to the body panel according to another aspect of the present disclosure.

FIG. 10 schematically illustrates a vehicle assembly 300 according to another aspect of the present disclosure. The vehicle assembly 300 includes an interior body panel 302, which can be an interior garnish panel for covering a part (i.e., an A-pillar) of the vehicle assembly 300. However, it should be appreciated that the depicted interior body panel 302 can be any interior body panel for covering a part of the vehicle assembly 300. For example, the interior body panel 302 can be part of a headliner, a dashboard, a door panel, and the like. The interior body panel 302 has an outer surface 304 including an opening portion 310. A cover or lid 312 according to one aspect is removably mounted to the body panel 302 and has a closed position (FIG. 11) for covering the opening portion 310 and an opened position (FIG. 13) where the lid 312 can be completely removed from the body panel 302. As will be described below, engagement between the lid 312 and the interior body panel 302 is adapted to allow the lid 312 to pivot at least partially into the opening portion 310 as the lid is moved from the closed position to the opened position (FIG. 12). This eliminates the need of a pry tool to move the lid 312.

Figure 11:
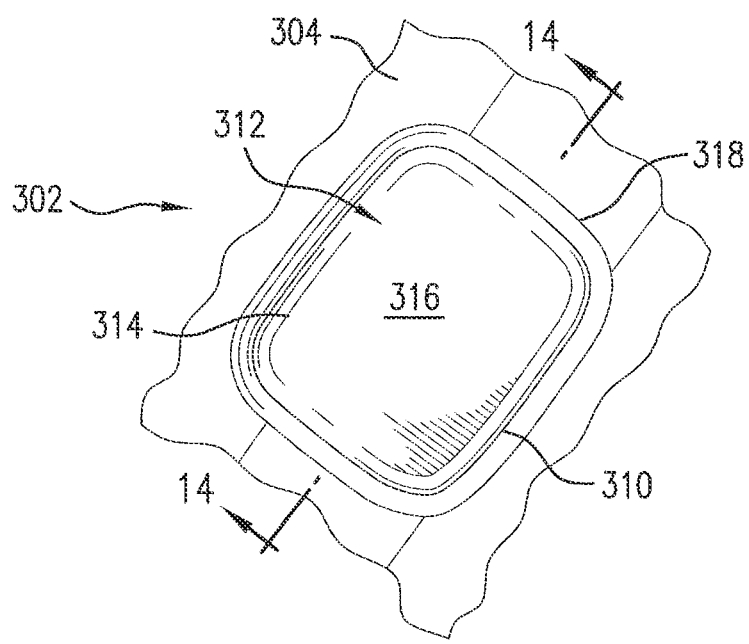
FIG. 11 is an enlarged view of the lid and interior body panel of FIG. 10 with the lid in a closed position.
Figure 12:
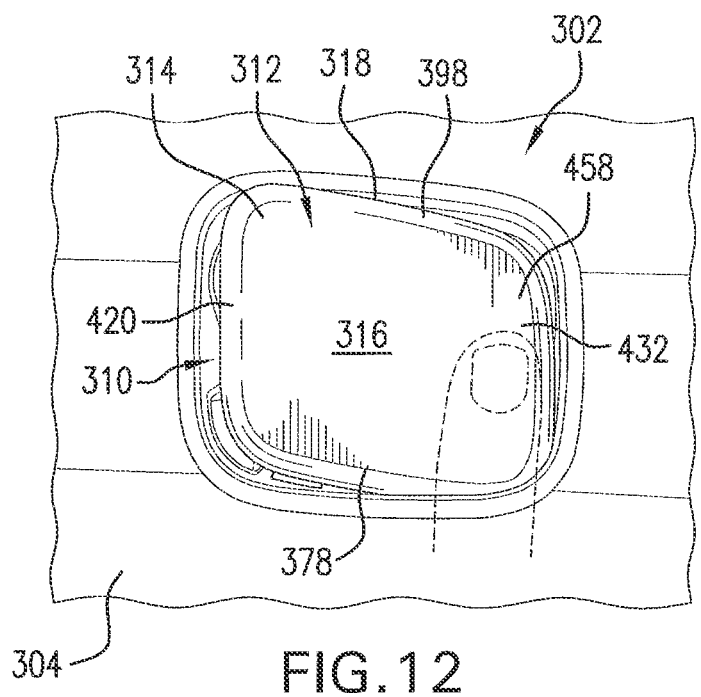
FIG. 12 is a view of the lid and interior body panel of FIG. 11 with the lid being moved from the closed position toward an opened position.

As best depicted in FIG. 11, the exemplary lid 312 defines a lid body 314 having an exterior surface 316. An edge portion 318 of the exterior surface 316 is continuous and without interruption about a periphery of the exterior surface 316 so that the exterior surface of the lid body 314 is flush with the outer surface 304 of the interior body panel 302 about the entire periphery of the lid body exterior surface 316. By having the edge portion 318 of the lid exterior surface 316 devoid of an interruption, such as a cut-out shape or raised feature to accommodate an operator's finger or hand space, the exemplary lid 312 does not affect the aesthetic appearance of the body panel 302.

Figure 13:
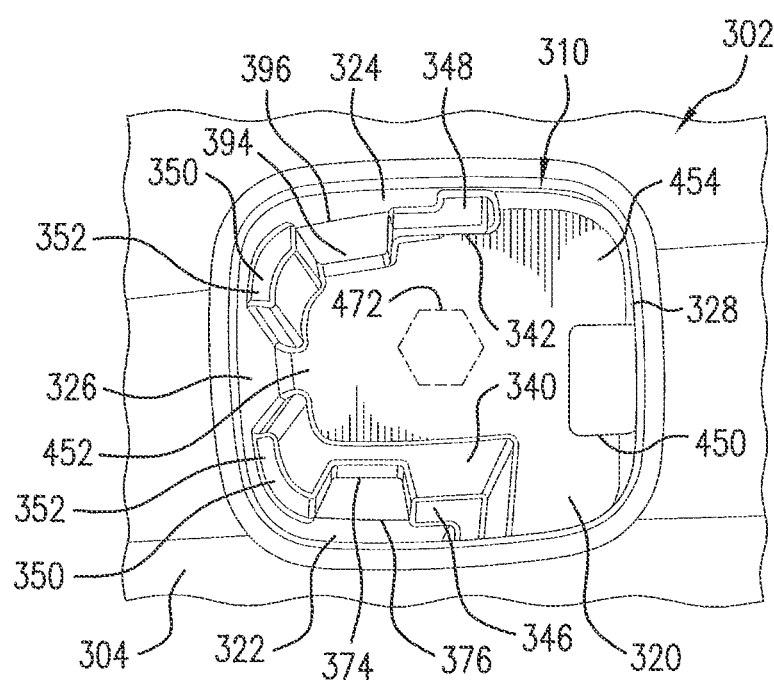
FIG. 13 is a schematic view of the interior body panel of FIG. 11 with the lid removed.
Figure 14:
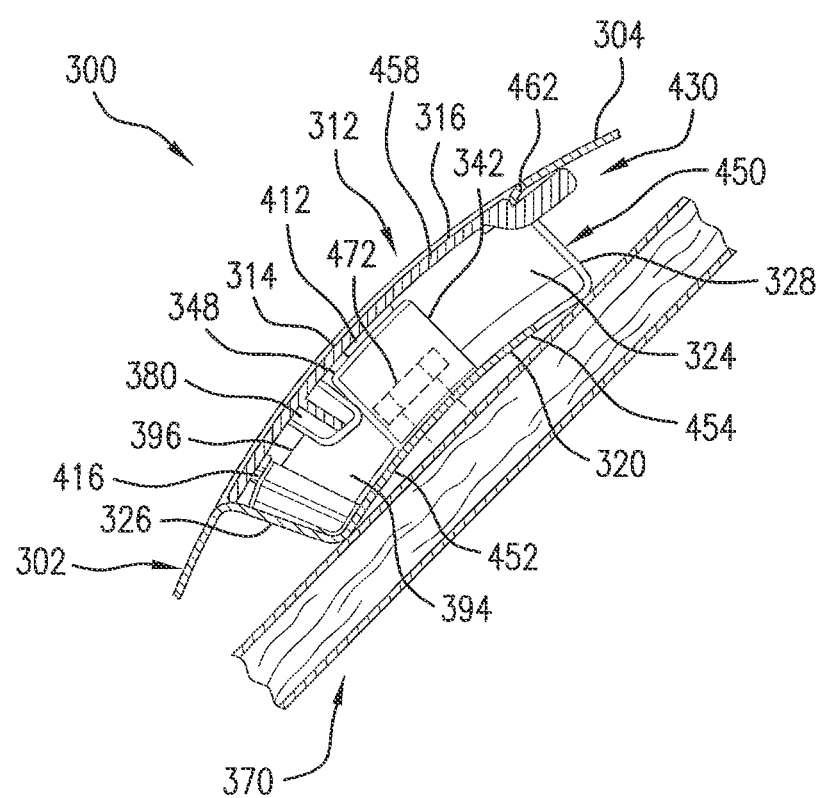
FIG. 14 is a cross-sectional view of the lid and body panel as shown in FIG. 11.

With reference to FIGS. 13 and 14, according to one aspect, the opening portion 310 of the interior body panel 302 includes a bottom wall 320, opposed first and second side walls 322, 324, and opposed first and second end walls 326, 328. The first and second side walls 322, 324 are configured to support the lid 312 in an at least a partially cantilevered condition over the bottom wall 320 in the closed position. To allow for this partially cantilevered condition of the lid 312, the first side wall 322 includes a first ledge 340 and the second side wall 324 includes a second ledge 342, each of the first and second ledges 340, 342 configured to support the lid 312 in the closed position. In the depicted embodiment, the first ledge 340 extends from a position adjacent the first end wall 326 along a majority of a length of the first side wall 322 and has a first engaging surface 346 which is offset inwardly from the outer surface 304 of the body panel 302. Similarly, the second ledge 342 extends from a position adjacent the first end wall 326 along a majority of a length of the second side wall 324 and has a second engaging surface 348 which is offset inwardly from the outer surface 304 of the body panel 302. To further support the lid 312 in the closed position, the first end wall 326 can include a third ledge 350, which can be at least partially defined by at least one of the first and second ledges 340, 342. As depicted, the third ledge 350 is defined by both the first and second ledges 340, 342 which are each extended onto the first end wall 326; although, this is not required. The third ledge 350 includes a third engaging surface 352 which is also offset inwardly from the outer surface 304 of the interior body panel 302.

Figure 16:
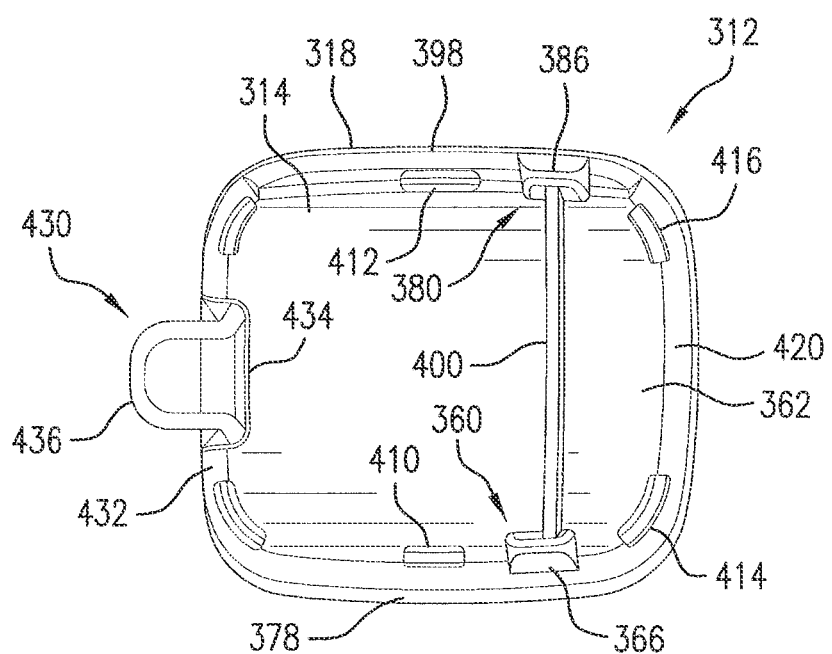
FIG. 16 is a bottom view of the exemplary lid of FIG. 15.
Figure 17:
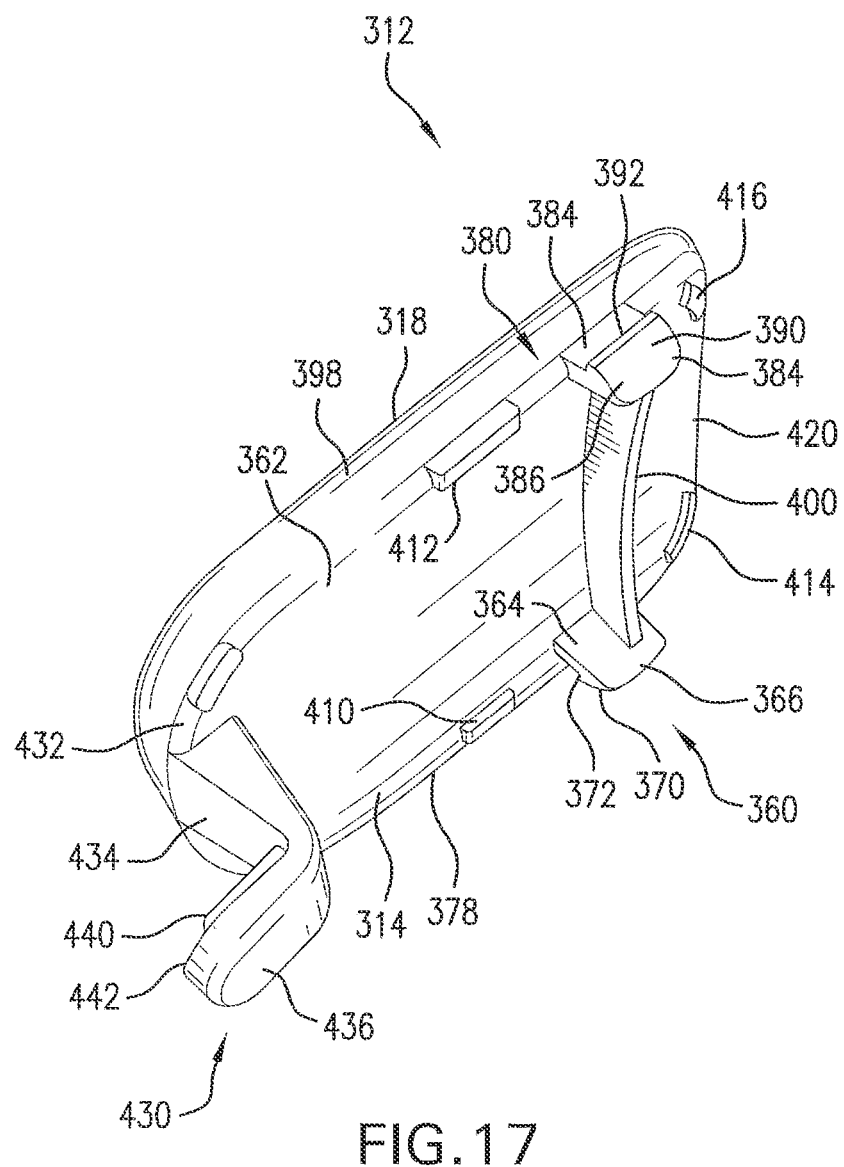
FIG. 17 is a bottom perspective view of the exemplary lid of FIG. 16.

To releasably secure the lid 312 to the interior body panel 302, the lid body 314 includes at least one engagement member configured to releasably engage one of the first side wall 322, second side wall 324 and first end wall 326 of the opening portion 310. In the depicted embodiment, the opening portion 310 includes at least one cutout located on one of the first side wall 322, second side wall 324 and first end wall 326 and sized to at least partially receive the at least one engagement member. More particularly, and as shown in FIGS. 16 and 17, the at least one engagement member is a first engagement member 360 extending from an interior surface 362 of the lid body 314. The first engagement member 360 includes a body 364 having one end attached to the interior surface 362. A checked or hooked shaped locking tab 366 is provided at the other end of the body 364. The locking tab 366 includes a first engaging surface 370 and a second engaging surface 372 and projects toward the edge portion 318. According to one aspect, as shown in FIG. 13, the at least one cutout is a first cutout 374 provided on the first side wall 322 and extending through the first ledge 340. With this location of the first cutout 374, the first engagement member 360 is located adjacent a side edge portion 378 of the lid body 314. The first cutout 374 is sized to receive the first engagement member 360, and in the closed position of the lid 312 the locking tab 366 releasably engages a portion 376 of the first side wall 322 that at least partially defines the first cutout 374.

The interior surface 362 of the lid body 314 can further include a second engagement member 380. The second engagement member 380 can be shaped similar to the first engagement member 360 and includes a body 384 having one end attached to the interior surface 362. A checked or hooked shaped locking tab 386 is provided at the other end of the body 364. The locking tab 386 includes a first engaging surface 390 and a second engaging surface 392 and projects toward the edge portion 318. The second engagement member 380 engages a second cutout 394 provided on the second side wall 324 and extending through the second ledge 342. With this location of the second cutout 394, the second engagement member 380 is located adjacent an opposite side edge portion 398 of the lid body 314. As shown in FIG. 14, the second cutout 394 is sized to receive the second engagement member 380, and in the closed position of the lid 312 the locking tab 386 releasably engages a portion 396 of the second side wall 324 that at least partially defines the second cutout 394. As depicted in FIGS. 16 and 17, the second engagement member 380 can be aligned with the first engagement member 360 on the lid body 314; although, this is not required. To provide added strength to the first and second engagement member, a rib 400 extending between and in contact with the respective bodies 364, 384 of the first and second engagement members 360, 380 can be located on the interior surface 362 of the lid body 314.

With continued reference to FIGS. 16 and 17, the interior surface 362 of the lid body 314 further includes ribs 410, 412, 414, 416 for engaging the first, second and third ledges 340, 342, 350 of the opening portion 310 in the closed position of the lid 312. In the depicted embodiment, rib 410 is positioned adjacent the side edge portion 378 and engages the first engaging surface 346 of the first ledge 340, and rib 412 is positioned adjacent the side edge portion 398 and engages the second engaging surface 348 of the second ledge 342. Rib 414 is positioned adjacent both the side edge portion 378 and an end portion 420 of the lid body 314 and can engage one of the first engaging surface 346 of the first ledge 340 and the third engaging surface 352 of the third ledge 350. Similarly, rib 416 is positioned adjacent both the side edge portion 398 and the end portion 420 and can engage one of the second engaging surface 348 of the second ledge 342 and the third engaging surface 352 of the third ledge 350. It should be appreciated that the ribs 410, 412, 414, 416 are appropriately sized to elevate the exterior surface 316 of the lid body 314 to provide a fit and finish that is flush with the outer surface 304 of the interior body panel 302, as shown in FIG. 11.

Figure 15:
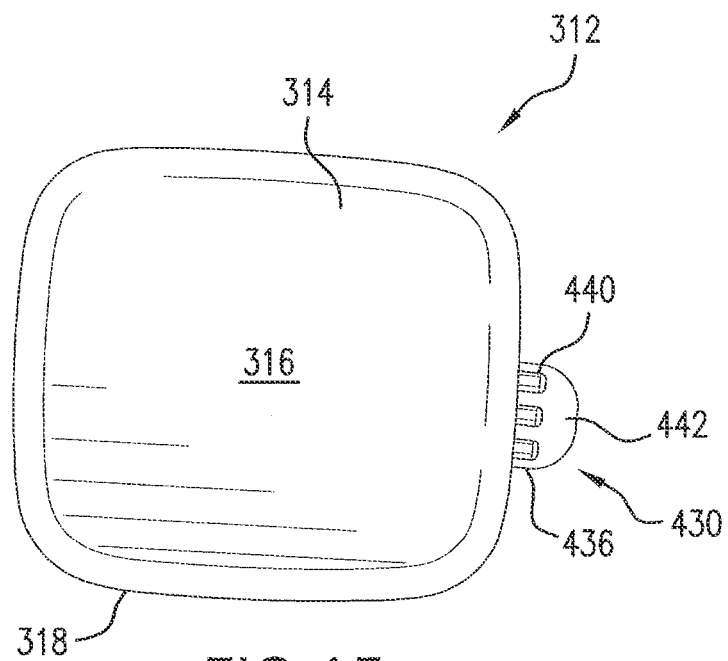
FIG. 15 is a top view of the exemplary lid of FIG. 11.

The lid body 314 further includes a retaining member 430 opposite the first and second engagement members 360, 380. According to one aspect, the retaining member 430 is in the form an L-shaped tab located on an opposite end portion 432 of the lid body 314 and is spaced inwardly from the opposed side edge portions 378, 398 of the lid body. It should be appreciated that the retaining member 430 can have alternative configurations, for example, the retaining member can be shaped similar to the first and second engagement members 360, 380. As illustrated in FIGS. 15-17, the retaining member 430 includes a first section 434 extending substantially perpendicularly from the interior surface 362 and a second section 436 extending substantially perpendicular to the first section 434 and away from the end portion 432. At least one rib 440 can be located on a surface 442 of the second section 436.

To accommodate the retaining member 430 in the closed position of the lid 312, at least one of the bottom wall 320 and second end wall 328 of the opening portion 310 includes a retaining hole 450. As shown, the retaining hole 450 is defined in both the bottom wall 320 and the second end wall 328 of the opening portion 310. This allows the retaining member 430 to move within the retaining hole 450 as the lid 312 is moved from the closed position to the opened position. Further, as best depicted in FIG. 14, the bottom wall 320 of the opening portion 310 includes a first section 452 having the first end wall 326 and a second section 454 having the second end wall 328. A portion 458 of the lid body 314 having the retaining member 430 is in an at least partially cantilevered position over the second section 454 in the closed position of the lid 312. The first and second side walls 322, 324 of the opening portion 310, and more particularly the first and second engaging surface 346, 348 of the respective first and second ledges 340, 342, define a pivot about which the portion 458 of the lid body 314 is moved inwardly toward the bottom wall 320. And with the location of the retaining hole 450 in the opening portion 310, the retaining member 430 moves through the retaining hole 450 yet remains positioned in the retaining hole.

As shown in FIG. 14, in the closed position of the lid 312, the at least one rib 440 of the retaining member 430 engages a portion 462 of the second end wall 328 that at least partially defines the retaining hole 450. The portion 458 of the lid body 314 having the retaining member 430 is at least partially suspended over the second section 454 of the bottom wall 320 in the closed position of the lid 312. The pivoting movement of the lid portion 458 toward the second section 454 (FIG. 12) moves the end portion 420 of the lid body having the first and second engagement members 360, 380 away from the opening portion 310, and moves the retaining member 430 though the retaining hole 450. This, in turn, disengages the first and second engagement members 360, 380 from the first and second side walls 322, 324. The lid 312 is now removable from the opening portion 310 of the body panel 302. It should be appreciated that the lid 312 can be tethered to, for example, the bottom wall 320 of the opening portion to prevent misplacement of the lid once removed from the opening portion 310. In the depicted embodiment, the opening portion 310 of the interior body panel 302 receives an attachment or fastener 372 for attaching an associated vehicle component, such as an airbag assembly 370, to the body panel 302. The lid 312 conceals or covers the fastener 372. Once access to the fastener 372 is no longer needed, the lid 312 can be placed back into the closed position by first positioning the retaining member 430 into the retaining hole 450. The lid 312 is then pivoted back toward the first end wall 326 so that the first and second engagement members 360, 380 are received in the respective first and second cutouts 374, 394 and in engagement with the first and second side walls 322, 324.

Figure 18:
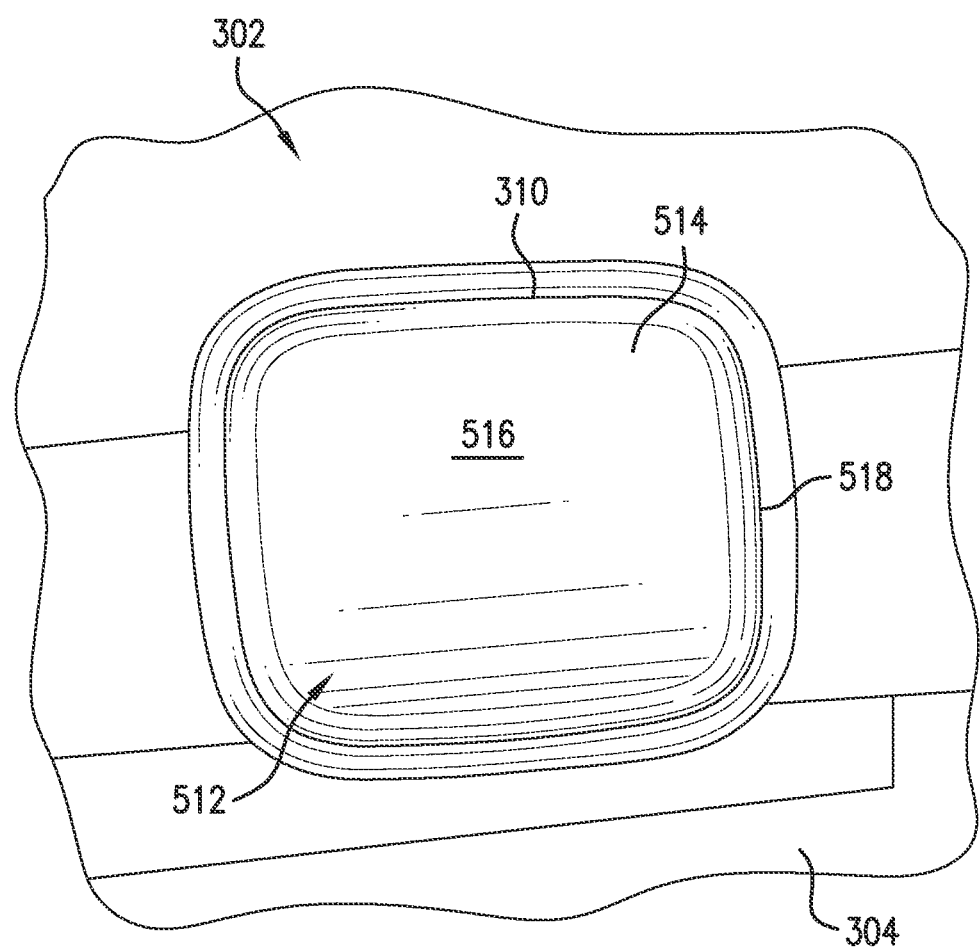
FIG. 18 is an enlarged view of a lid according to another aspect and the interior body panel of FIG. 10 with the lid in a closed position.
Figure 19:
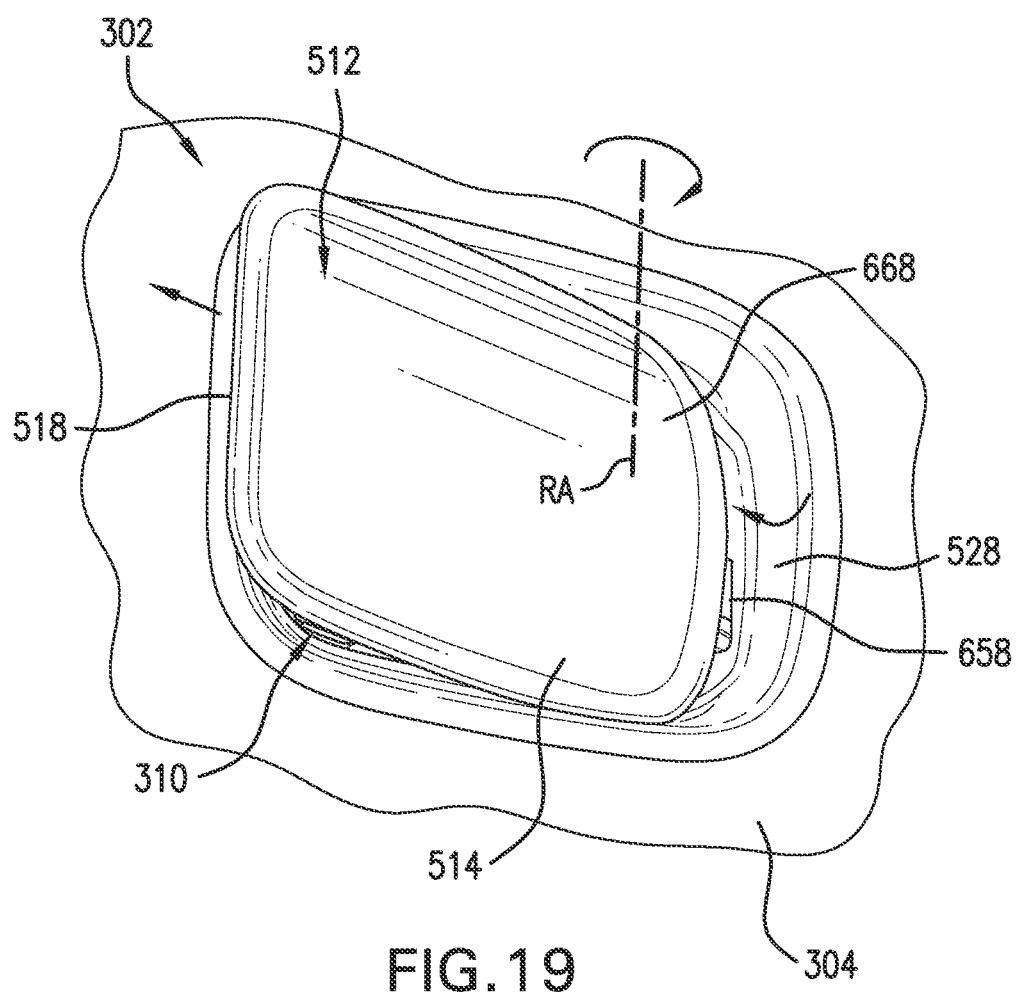
FIG. 19 is a view of the lid and the interior body panel of FIG. 18 with the lid being moved from the closed position toward an opened position.

A cover or lid 512 according to another aspect of the present disclosure is removably mounted to the interior body panel 302 and has a closed position (FIG. 18) for covering the opening portion 310 and an opened position (FIG. 20) where the lid 512 can be completely removed from the body panel 302. Similar to the previous embodiment of the lid 312, engagement between the lid 512 and the interior body panel 302 is adapted to allow the lid 512 to pivot at least partially into the opening portion 310 as the lid 512 is moved from the closed position to the opened position (FIG. 19). Again, this eliminates the need of a pry tool to move the lid 512. As best depicted in FIG. 18, the exemplary lid 512 defines a lid body 514 having an exterior surface 516. An edge portion 518 of the exterior surface 516 is continuous and without interruption about a periphery of the exterior surface 516 so that the exterior surface of the lid body 514 is flush with the outer surface 304 of the interior body panel 302 about the entire periphery of the lid body exterior surface 316. By having the edge portion 518 of the lid exterior surface 516 devoid of an interruption, such as a cut-out shape or raised feature to accommodate an operator's finger or hand space, the exemplary lid 512 does not affect the aesthetic appearance of the body panel 302.

Figure 20:
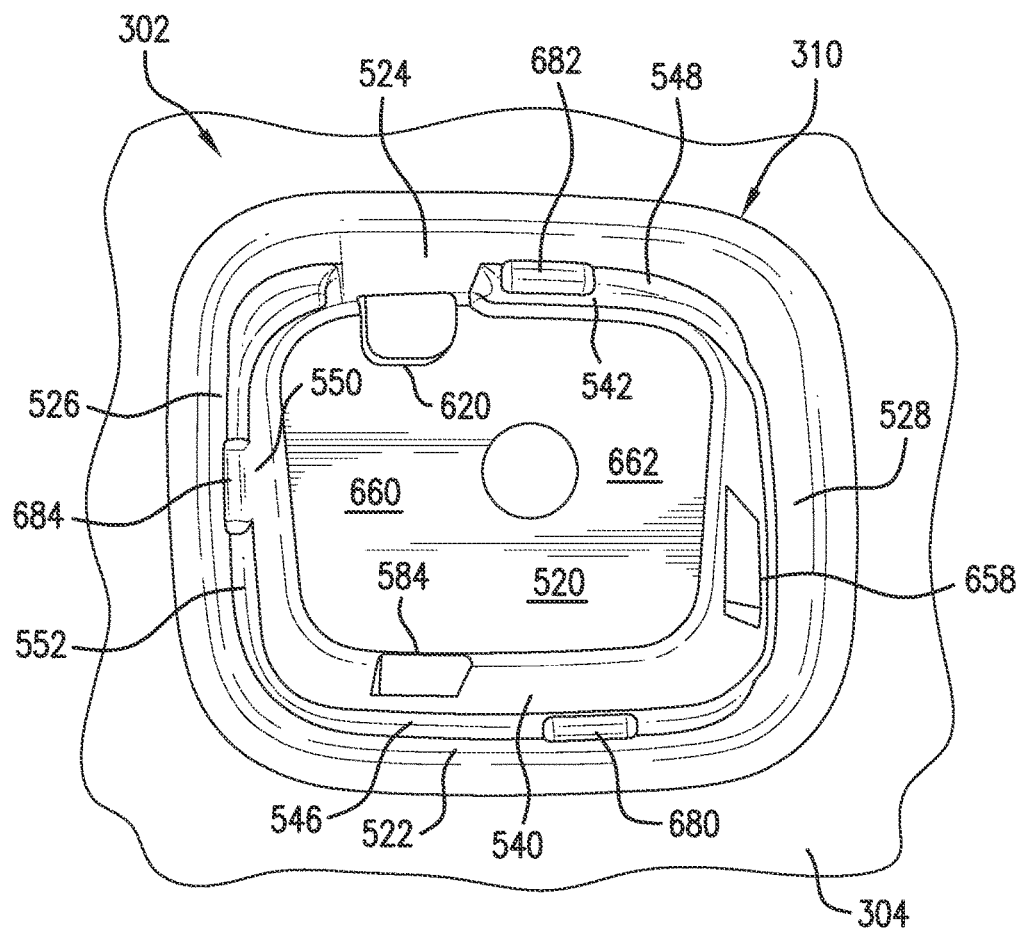
FIG. 20 is a schematic view of the interior body panel of FIG. 18 with the lid removed.
Figure 21:
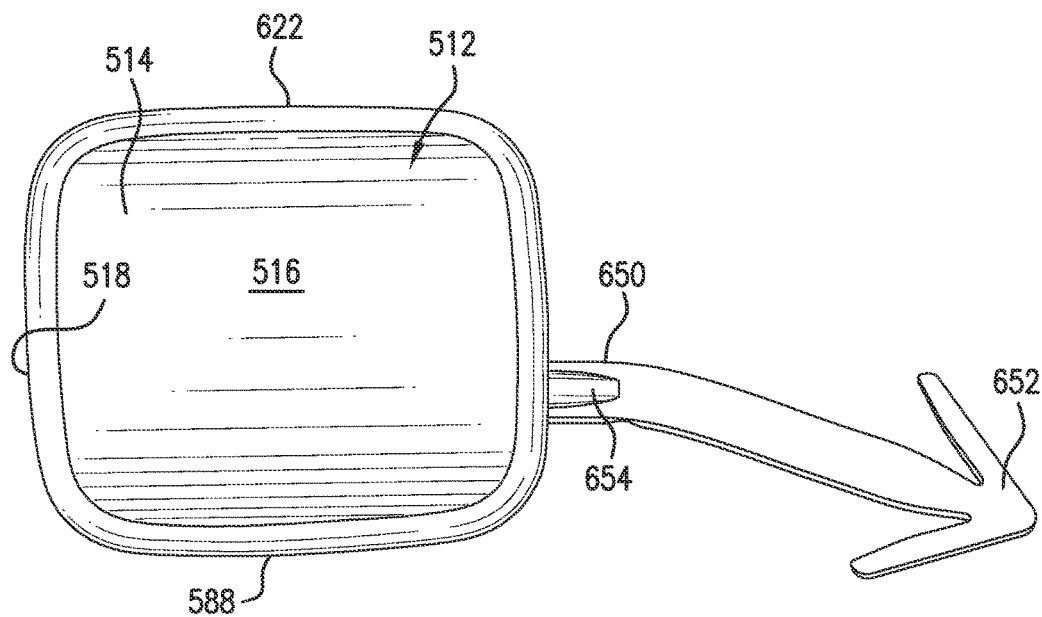
FIG. 21 is a top view of the exemplary lid of FIG. 18.

With reference to FIG. 20, according to another aspect of the interior body panel 302, the opening portion 310 includes a bottom wall 520, opposed first and second side walls 522, 524, and opposed first and second end walls 526, 528. The first and second side walls 522, 524 are configured to support the lid 512 in an at least a partially cantilevered condition over the bottom wall 520 in the closed position. To allow for this partially cantilevered condition of the lid 512, the first side wall 522 includes a first ledge 540 and the second side wall 524 includes a second ledge 542, each of the first and second ledges 540, 542 configured to support the lid 512 in the closed position. In the depicted embodiment, the first ledge 540 extends from a position adjacent the first end wall 526 along a majority of a length of the first side wall 522 and has a first engaging surface 546 which is offset inwardly from the outer surface 304 of the body panel 302. Similarly, the second ledge 542 extends from a position adjacent the first end wall 526 along a majority of a length of the second side wall 524 and has a second engaging surface 548 which is offset inwardly from the outer surface 304 of the body panel 302. To further support the lid 512 in the closed position, the first end wall 526 can include a third ledge 550. The third ledge 550 includes a third engaging surface 552 which is also offset inwardly from the outer surface 304 of the interior body panel 302.

Figure 22:
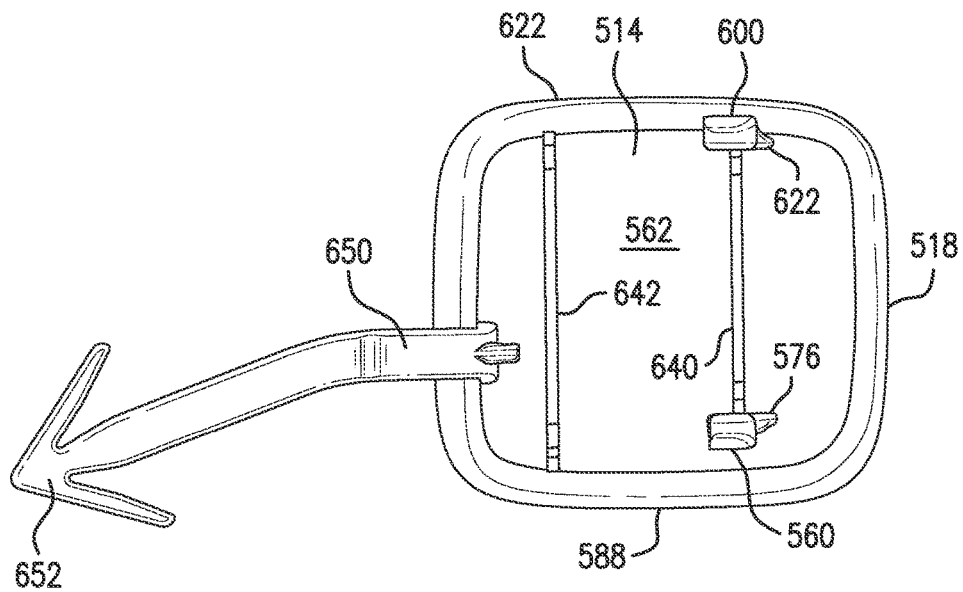
FIG. 22 is a bottom view of the exemplary lid of FIG. 21.
Figure 23:
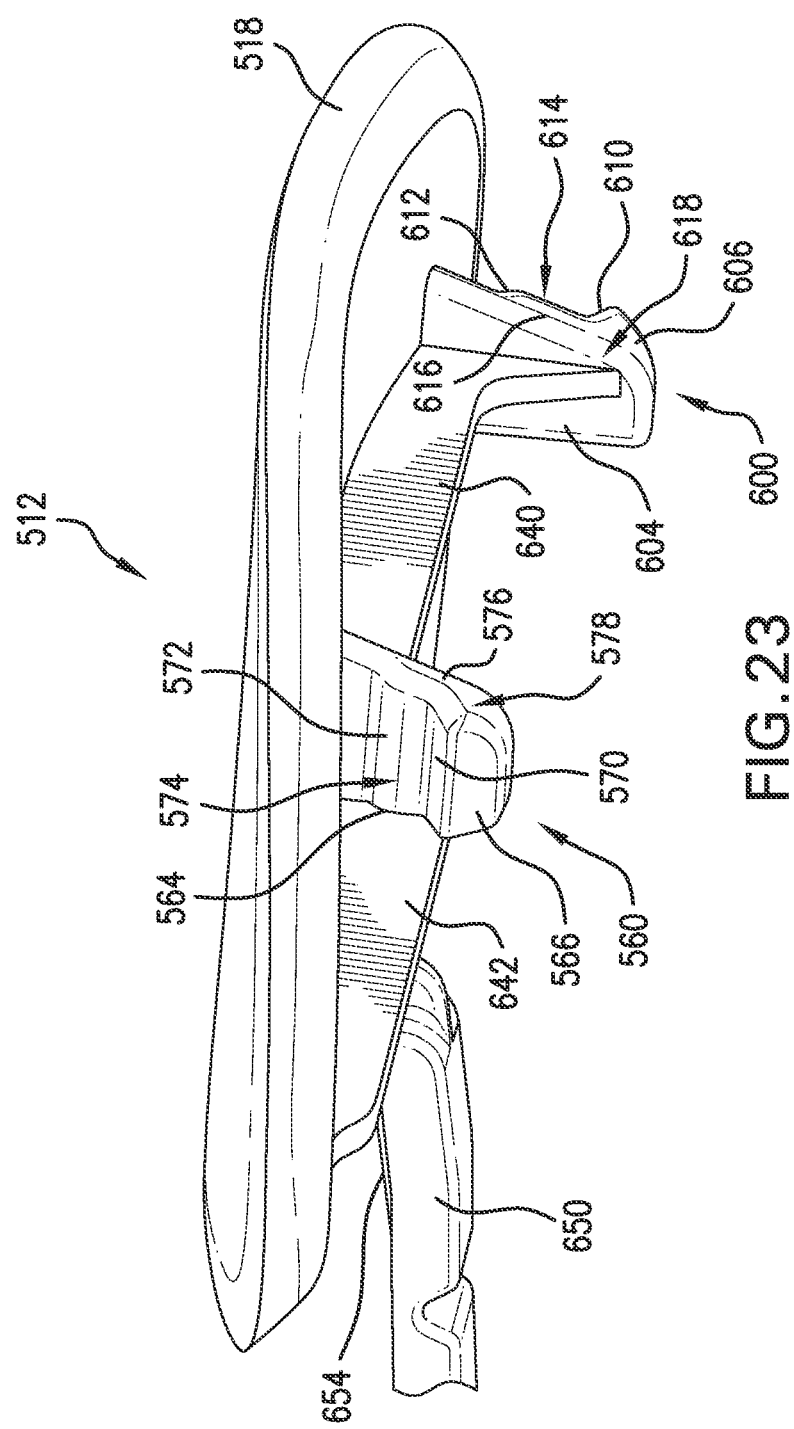
FIG. 23 is a bottom perspective view of the exemplary lid of FIG. 22.

To releasably secure the lid 512 to the interior body panel 302, the lid body 514 includes at least one engagement member configured to releasably engage one of the first side wall 522, second side wall 524 and first end wall 526 of the opening portion 310. In the depicted embodiment, the opening portion 310 includes at least one cutout located on one of the first side wall 522, second side wall 524 and first end wall 526 and sized to at least partially receive the at least one engagement member. More particularly, and as shown in FIGS. 22 and 23, the at least one engagement member is a first engagement member 560 extending from an interior surface 562 of the lid body 514. The first engagement member 560 includes a body 564 having one end attached to the interior surface 562. A checked or hooked shaped locking tab 566 is provided at the other end of the body 564. The locking tab 566 includes a first engaging surface 570 and a second engaging surface 572 and projects toward the edge portion 518. The first engaging surface 570 defines a first control location 574 of the locking tab 566 and a side 576 of the first engagement member 560 defines a second control location 578 of the locking tab 566. The first and second control locations 574, 578 ensure proper positioning of the lid 512 in the closed position. According to one aspect, as shown in FIG. 20, the at least one cutout is a first cutout 584 provided on the first side wall 522 and extending through the first ledge 540. With this location of the first cutout 584, the first engagement member 560 is located adjacent a side edge portion 588 of the lid body 514. The first cutout 584 is sized to receive the first engagement member 560, and in the closed position of the lid 512 the first engaging surface 570 of the locking tab 566 is in contact with (i.e., releasably engages) a first portion 590 of the first side wall 522 and the side 576 of the locking tab 566 is in contact with (i.e., releasably engages) a second portion 592 of the first side wall 522 (see FIGS. 24 and 25). As depicted, the first and second portions 590, 592 together at least partially define the first cutout 584.

Figure 24:
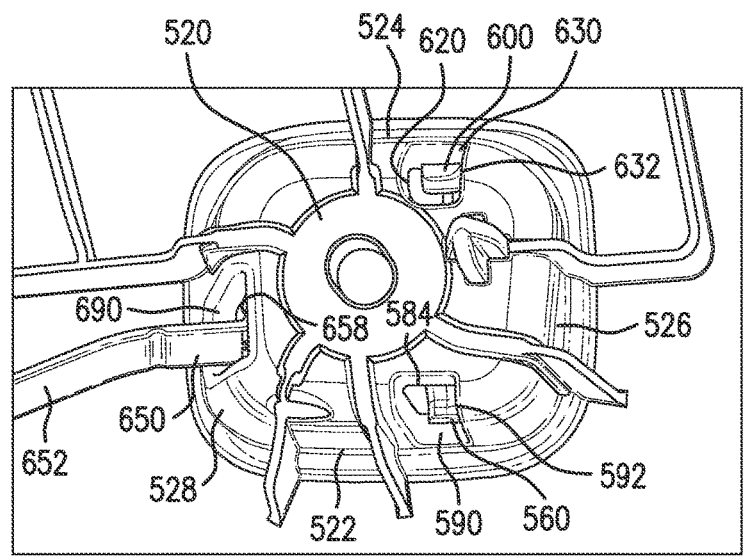
FIG. 24 is a bottom perspective view of FIG. 11.
Figure 25:
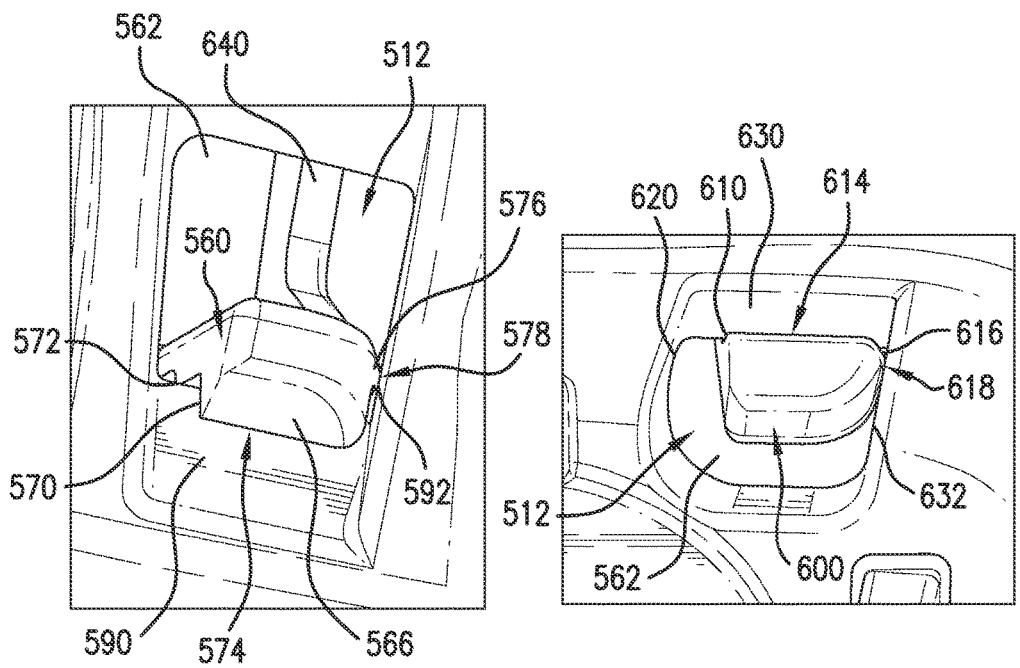
FIGS. 25 and 26 are enlarged views of engagement locations of the lid and the interior body panel of FIG. 24.
Figure 26:
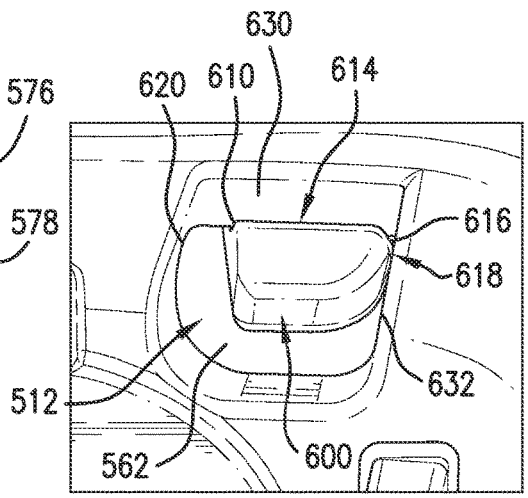

The interior surface 562 of the lid body 514 can further includes a second engagement member 600. The second engagement member 600 can be shaped similar to the first engagement member 560 and includes a body 604 having one end attached to the interior surface 562. A checked or hooked shaped locking tab 606 is provided at the other end of the body 564. The locking tab 606 includes a first engaging surface 610 and a second engaging surface 612 and projects toward the side edge portion 588. Similar to the locking tab 566, the first engaging surface 610 defines a first control location 614 of the locking tab 606 and a side 616 of the second engagement member 600 defines a second control location 618 of the locking tab 606. Again, the first and second control locations 614, 618 ensure proper positioning of the lid 512 in the closed position. The second engagement member 600 engages a second cutout 620 provided on the second side wall 524 and extending through the second ledge 542. With this location of the second cutout 620, the second engagement member 600 is located adjacent an opposite side edge portion 622 of the lid body 514. As shown in FIGS. 24 and 26, the second cutout 620 is sized to receive the second engagement member 600, and in the closed position of the lid 512 the first engaging surface 610 of the locking tab 606 is in contact with (i.e., releasably engages) a first portion 630 of the second side wall 524 and the side 616 of the locking tab 606 is in contact with (i.e., releasably engages) a second portion 632 of the second side wall 524. As depicted, the first and second portions 630, 632 together at least partially define the second cutout 620. As depicted in FIGS. 22 and 23, the second engagement member 600 can be aligned with the first engagement member 560 on the lid body 514; although, this is not required. To provide added strength to the first and second engagement members 560, 600, a first rib 640 extending between and in contact with the respective bodies 564, 604 of the first and second engagement members 560, 600 can be located on the interior surface 562 of the lid body 514. Further, a second rib 642 extending between the side edge portions 588, 622 can be located on the interior surface 562 of the lid body 514.

The lid body 514 further includes a retaining member 650 having a tether 652. At least one rib 654 can be located on a surface of the retaining member 650. To accommodate the retaining member 650 in the closed position of the lid 512, at least one of the bottom wall 520 and second end wall 528 of the opening portion 310 includes a retaining hole 658. As shown, the retaining hole 658 is defined in both the bottom wall 520 and the second end wall 528 of the opening portion 310. This allows the retaining member 650 to move within the retaining hole 658 as the lid 512 is moved from the closed position to the opened position. In the closed position of the lid 512, the at least one rib 654 of the retaining member 650 engages a portion 690 of the second end wall 528 that at least partially defines the retaining hole 658.

Further, as best depicted in FIG. 20, the bottom wall 520 of the opening portion 310 includes a first section 660 having the first end wall 526 and a second section 662 having the second end wall 528. As shown in FIG. 19, a portion 668 of the lid body 514 having the retaining member 650 is in an at least partially cantilevered (i.e., suspended) position over the second section 662 in the closed position of the lid 512. The first and second side walls 522, 524 of the opening portion 310, and more particularly the first and second engaging surface 546, 548 of the respective first and second ledges 540, 542, define a pivot about which the portion 668 of the lid body 514 is moved or rotated inwardly toward the bottom wall 520. And with the location of the retaining hole 658 in the opening portion 310, the retaining member 650 moves through the retaining hole 658 yet remains positioned in the retaining hole. It should be appreciated that raised portions or ribs 680, 682, 684 can be provided on the respective first, second and third ledges 540, 542, 550 to elevate the exterior surface 516 of the lid body 514 to provide a fit and finish that is flush with the outer surface 304 of the interior body panel 302, as shown in FIG. 18. The ribs 680, 682 can further define the pivot about which the portion 668 of the lid body 514 is moved inwardly toward the bottom wall 520.

With reference to FIGS. 19 and 20, the first and second ledges 540, 542 at a location near the second end wall 524 curve downwardly toward the bottom wall 520. The second end wall 524 serves as a 0-touch guide surface allowing the lid 512 to slide and rotate about a rotation axis RA from the closed position to the opened position. The pivoting or rotating movement of the lid portion 668 about the rotation axis RA toward the second section 662 (FIG. 20) moves the end portion of the lid body 514 having the first and second engagement members 560, 600 away from the opening portion 310, and moves the retaining member 650 though the retaining hole 658. This, in turn, disengages the first and second engagement members 560, 600 from the first and second side walls 522, 524. The lid 512 is now removable from the opening portion 310 of the body panel 302. It should be appreciated that the lid 512 can be tethered to, for example, the bottom wall 520 of the opening portion 310 via the tether 652 to prevent misplacement of the lid 512 once removed from the opening portion 310. As indicated previously, the opening portion 310 of the interior body panel 302 receives an attachment or fastener for attaching an associated vehicle component, such as an airbag assembly, to the body panel 302. The lid 512 conceals or covers the fastener. Once access to the fastener is no longer needed, the lid 512 can be placed back into the closed position by first positioning the retaining member 650 into the retaining hole 658. The lid 512 is then pivoted back toward the first end wall 526 so that the first and second engagement members 560, 600 are received in the respective first and second cutouts 584, 620 and in engagement with the first and second side walls 522, 524.

As is evident from the foregoing, a method of covering an opening portion 310 provided in an interior vehicle body panel 302 comprises providing a lid 312, 512 having a lid body 314, 514 sized to be received in the opening portion 310 such that in a closed position of the lid an exterior surface 316, 516 of the lid body is flush with an outer surface 304 of the body panel; releasably supporting a first portion of the lid body 314, 514 in the opening portion; cantilevering a second portion of the lid body 314, 514 in the opening portion; and pivoting the second portion of the lid body 314, 514 inwardly into the opening portion 310 to move from the lid 312, 512 from the closed position toward an opened position. The exemplary method further comprises releasably engaging first and second side walls 322, 324, 522, 524 of the opening portion 310 with first and second engagement members 360, 380, 560, 600 of the lid body 314, 514; releasably engaging one of first and second end walls of the opening portion 310 with a retaining member 430, 650; and moving the retaining member 430, 650 at least partially through the retaining hole 450, 658 as the lid 312, 512 is pivoted from the closed position toward the opened position.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A vehicle assembly comprising:
an interior body panel having an outer surface including an opening portion; and
a lid removably mounted to the body panel and having a closed position for covering the opening portion and an opened position, engagement between the lid and the body panel being adapted to allow the lid to pivot at least partially into the opening portion as the lid is moved from the closed position to the opened position, the lid defining a lid body having an exterior surface, an edge portion of the exterior surface being continuous and without interruption about a periphery of the exterior surface so that the lid body exterior surface is flush with the body panel outer surface about the entire periphery of the lid body exterior surface,
wherein the opening portion of the body panel includes a bottom wall, opposed first and second side walls, and opposed first and second end walls,
the first and second side walls of the opening portion define a pivot about which a portion of the lid body is moved inwardly toward the bottom wall, and
the lid body includes at least one engagement member configured to releasably engage one of the first and second side walls of the opening portion for securing the lid to the body panel,
wherein the opening portion includes at least one ledge configured to support a first end portion of the lid body over the bottom wall of the opening portion in the closed position, the at least one ledge provided on at least one of the first side wall, the second side wall and the first end wall, and in the closed position a second end portion of the lid body is spaced from the at least one ledge and is suspended over the bottom wall.

2. The assembly of claim 1, wherein the at least one ledge includes a first ledge and a second ledge provided on the respective first side wall and the second side wall, each of the first and second ledges configured to support the first end portion of the lid body in the closed position.

3. The assembly of claim 2, wherein the at least one ledge includes a third ledge provided on the first end wall, the third ledge configured to support the first end portion of the lid body in the closed position.

4. The assembly of claim 3, where the third ledge is at least partially defined by at least one of the first and second ledges.

5. The assembly of claim 1, wherein the lid body includes first and second engagement members, and the first and second side walls of the opening portion each includes a cutout sized to at least partially receive one of the first and second engagement members.

6. The assembly of claim 1, wherein the lid body further includes a retaining member and at least one of the bottom wall and the second end wall of the opening portion includes a retaining hole sized to movably receive the retaining member.

7. The assembly of claim 6, wherein the opening portion includes a first section having the first end wall and a second section having the second end wall, wherein the second end portion of the lid body has the retaining member and is suspended over the second section in the closed position of the lid.

8. The assembly of claim 6, wherein the retaining member engages the second end wall in the closed position of the lid.

9. The assembly of claim 1, wherein the interior body panel at least partially houses an associated airbag assembly, an attachment for releasably securing the associated airbag assembly to the body panel being located in the opening portion, the lid covering the attachment.

10. An interior body panel assembly for a vehicle comprising:
an interior body panel having an outer surface including an opening portion for receiving an attachment for releasably attaching an associated vehicle component to the body panel, the opening portion including a bottom wall, opposed first and second side walls, and opposed first and second end walls; and
a lid removably mounted to the body panel and having a closed position for covering the opening portion and an opened position, the lid defining a lid body having an exterior surface, a peripheral edge portion of the exterior surface being flush with the body panel outer surface, the lid body having an engagement member configured to releasably engage the first side wall of the opening portion,
wherein the first and second side walls include respective first and second ledges configured to support a first end portion of the lid body over the bottom wall of the opening portion in the closed position, wherein in the closed position a second end portion of the lid body is spaced from the first and second ledges and is suspended over the bottom wall.

11. The assembly of claim 10, wherein the first side wall includes a cutout sized to at least partially receive the engagement member.

12. The assembly of claim 11, wherein the lid body includes a pair of similarly shaped engagement members configured to releasably engage the first and second side walls, and each of the first and second side walls includes a cutout sized to at least partially receive one of the engagement members.

13. The assembly of claim 10, wherein the first and second ledges together define a pivot about which the second end portion of the lid body is moved inwardly toward the bottom wall.

14. The assembly of claim 10, wherein the lid body includes a retaining member configured to engage the second end wall in the closed position of the lid, and at least one of the bottom wall and the second end wall of the opening portion includes a retaining hole sized to movably receive the retaining member.

15. A method of covering an opening portion provided in an interior vehicle body panel comprising:
providing a lid having a lid body sized to be received in the opening portion such that in a closed position of the lid an exterior surface of the lid body is flush with an outer surface of the body panel;
releasably supporting a first end portion of the lid body in the opening portion;
cantilevering a second end portion of the lid body in the opening portion, wherein in the closed position the second end portion of the lid body is suspended over a bottom wall of the opening portion; and
pivoting the second end portion of the lid body inwardly into the opening portion to move from the lid from the closed position toward an opened position,
wherein the opening portion includes the bottom wall, opposed first and second side walls, and opposed first and second end walls, the bottom wall including a retaining hole, and the lid body includes first and second engagement members and a retaining member,
wherein the first and second side walls include respective first and second ledges configured to support the first end portion of the lid body over the bottom wall of the opening portion in the closed position, wherein in the closed position the second end portion of the lid body is spaced from the first and second ledges, and
the method further comprising:
releasably engaging the first and second side walls of the opening portion with the first and second engagement members of the lid body;
releasably engaging one of the first and second end walls of the opening portion with the retaining member; and
moving the retaining member at least partially through the retaining hole as the lid is pivoted from the closed position toward the opened position.

* * * * *